(12) United States Patent
Wige

(10) Patent No.: US 7,303,497 B1
(45) Date of Patent: Dec. 4, 2007

(54) DUAL-INPUT DIFFERENTIAL PLANETARY GEAR TRANSMISSION

(75) Inventor: Russell Wige, Las Vegas, NV (US)

(73) Assignee: Insight3D, Inc., Las Vegas, NV (US)

( * ) Notice: Subject to any disclaimer, the term of this patent is extended or adjusted under 35 U.S.C. 154(b) by 0 days.

(21) Appl. No.: 11/135,879

(22) Filed: May 23, 2005

Related U.S. Application Data (63) Continuation of application No. 10/095,836, filed on Mar. 11, 2002, now abandoned.

(51) Int. Cl.
*F16H 3/72* (2006.01)

(52) U.S. Cl. .......................... 475/1; 475/248; 475/331; 475/334; 475/337

(58) Field of Classification Search .................... 475/1, 475/248, 331, 334, 337, 903
See application file for complete search history.

(56) References Cited

U.S. PATENT DOCUMENTS

| | | | |
|---|---|---|---|
| 1,470,947 A * | 10/1923 | Tyler | 475/347 |
| 4,088,041 A | 5/1978 | Kraus | |
| 4,922,790 A | 5/1990 | Abbott et al. | |
| 5,098,358 A | 3/1992 | Igaku | |
| 5,201,690 A * | 4/1993 | Dooner et al. | 475/17 |
| 5,295,925 A | 3/1994 | Hirabayashi | |
| 5,569,108 A * | 10/1996 | Cadee et al. | 475/1 |
| 5,800,302 A * | 9/1998 | Werre | 475/1 |
| 6,132,330 A * | 10/2000 | Leggett | 475/335 |
| 6,220,984 B1 | 4/2001 | Schulz et al. | |
| 6,547,689 B2 * | 4/2003 | Baker, Jr. | 475/331 |
| 6,676,558 B2 * | 1/2004 | Futterer | 475/346 |

* cited by examiner

*Primary Examiner*—David D. Le
(74) *Attorney, Agent, or Firm*—Rob L. Phillips; Greenberg Traurig (57) ABSTRACT

A dual planetary gear transmission having two planetary gear sets rotatably mounted on a common grounded axle wherein sun gears span both planetary gear sets providing a system for gear movement to be transferred between both gear sets whereby additional input allows modification to a differential relationship between the main transmission members. The disclosed transmission has many applications, including integration within a weight-generating device.

8 Claims, 8 Drawing Sheets

DUAL-INPUT DIFFERENTIAL PLANETARY GEAR TRANSMISSION

CROSS REFERENCE TO RELATED APPLICATIONS

This application is a continuation of application Ser. No. 10/095,836 filed Mar. 11, 2002 now abandoned.

FIELD OF INVENTION

The present invention relates generally to a dual planetary gear transmission. More particularly, this invention relates to a planetary gear transmission having a rotary motor input, rotary differential input and rotary output member with a 1 to 1 ratio between the motor input and the output when the differential input is at rest. However, at any given motor input, an angle change to the differential input can be added thus creating a proportional offset differential angle between an input motor member and an output member.

DESCRIPTION OF THE PRIOR ART

Gears are used in various devices including, but not limited to, automobiles, electric screwdrivers, VCRs and clocks. Automobile transmissions utilize planetary gear arrangements to produce the various gear ratios necessary to drive the automobile. A conventional planetary gear transmission includes a sun gear, planet gears, a planet gear carrier and a ring gear. The output to input gear ratio is then a function of which gear set is selected as the input, output and stationary member.

An example of a planetary gear transmission is described and claimed in U.S. Pat. No. 5,295,925 (the '925 patent) to Hirabayashi. The '925 patent is directed to a two stage planetary gear transmission. The uniqueness of the '925 patent resides in a cantilevered pinion shaft of the second stage that adjusts misalignment or improper meshing of the gears of the first stage and a lubricant layer that adjusts improper meshing of the gears of the second stage.

Another example of a planetary gear transmission is described in U.S. Pat. No. 5,098,358 (the '358 patent) to Igaku. The object of the '358 patent is the ability to reduce the cost of manufacturing and assembling while alleviating noise generation of the transmission in practice.

In yet another example of a planetary gear transmission U.S. Pat. No. 4,088,041 (the '041 patent) to Kraus sets forth an energy storing flywheel drive. Two counter rotating flywheels remove the gyroscopic forces. However, typically heavy bearings and strong housing portions are necessary to contain said transmission arrangement. The '041 patent thus describes a new support arrangement to eliminate the use of heavy bearings and strong housing portions.

The present invention is dual transmission arrangement whereby two planetary gear sets are configured in a mirrored arrangement. The arrangement of the present invention allows a 1 to 1 ratio between a motor input member and motor output member in a first mode of operation. A second mode of operation is possible by changing an angle of a differential input creating a proportional offset differential angle between a motor input member and motor output member independent of motor input speed.

SUMMARY OF THE INVENTION

An object of the present invention is to provide an apparatus having a secondary input including a rotational angle that causes a differential angle between two rotary members which rotate in a common direction and with a common speed.

Another object of the present invention is to provide an apparatus having a common motorized input rotary member, two output rotary members rotating in a common direction and with a common speed as the motorized input and two secondary inputs including a rotational angle that causes a differential angle between the motorized input and the two output rotary members.

Yet another object of the present invention is to provide an apparatus capable of handling high torque stresses applied to one or more differential inputs.

DISCLOSURE OF THE INVENTION

The present invention consists of a planetary gear type transmission having a common grounded shaft in communication with a first and second input member and a common output member. The transmission is designed such that it adheres to the following four significant characteristics: 1) as long as the second input is at rest, the first input and common output rotate in the same direction with the same speed; 2) changing an input angle of the second input causes a differential angle between the first input and common output, said differential angle remaining constant until said second input returns to an original position or said input angle is changed; 3) the input angle may be added at any time independent of the first input=s rotational speed; and 4) the first input has no effect on the differential angle caused by angling the second input. In a second embodiment the above defined characteristics are implemented in a planetary gear type transmission having a mirrored configuration having four gear sets. The mirrored version includes two output members and two secondary rotary input members which act as differentials between a motor input and the two output members. Each planetary gear set rotates about a common grounded axis.

The described transmission configurations allow the transmission to operate in multiple modes. A first mode of operation is created when the differential input is stationary (i.e. no input angle). A stationary input results in a 1 to 1 ratio in both direction and speed between the motor input member and the motor output member. A second mode of operation is created when the differential input is not stationary (i.e. input angle). Changing the input angle results a proportional offset differential angle between the motor input member and motor output members independent of the motor input rotational speed.

The transmission of the present invention is more versatile than described and/or suggested by the prior art. By changing the input angle a differential angle between the motor input member and the motor output member is instantaneously created thus changing the ratio between the input member and the output member. While the available uses for such a transmission are varied, weight training is an ideal use. By way of example, it is envisioned that the transmission detailed herein will be incorporated within a centrifugal force weight-generating device and will replace the weights of a conventional weight apparatus. Rather than large masses, resistance will be relative to the centrifugal forces created by a motor input such that one or more small masses are displaced a certain distance from a centralized location. By implementing the present invention into a weight-generating device, masses of two pounds may create resistance equivalent to five hundred pounds. By traveling along opposing dual spiral cam-like paths attached to the transmission=s motor input member and the motor output member, the masses traveling between minimum and maximum limits will be prevented from moving as long as the differential input is at rest (e.g. input/output member=s ratio 1:1). In response to a user governing the transmission=s differential input (e.g. pulling on a handle attached to a cable) a proportional offset differential angle will be created between the input/output members thus driving the masses towards the minimum limit or the maximum limit as tension is relived up to a point that the masses reach the maximum limit where no tension is required. In this configuration the one or more small masses and the transmission generate resistive forces equivalent to large masses.

DESCRIPTION OF THE EMBODIMENTS

Figure 1:
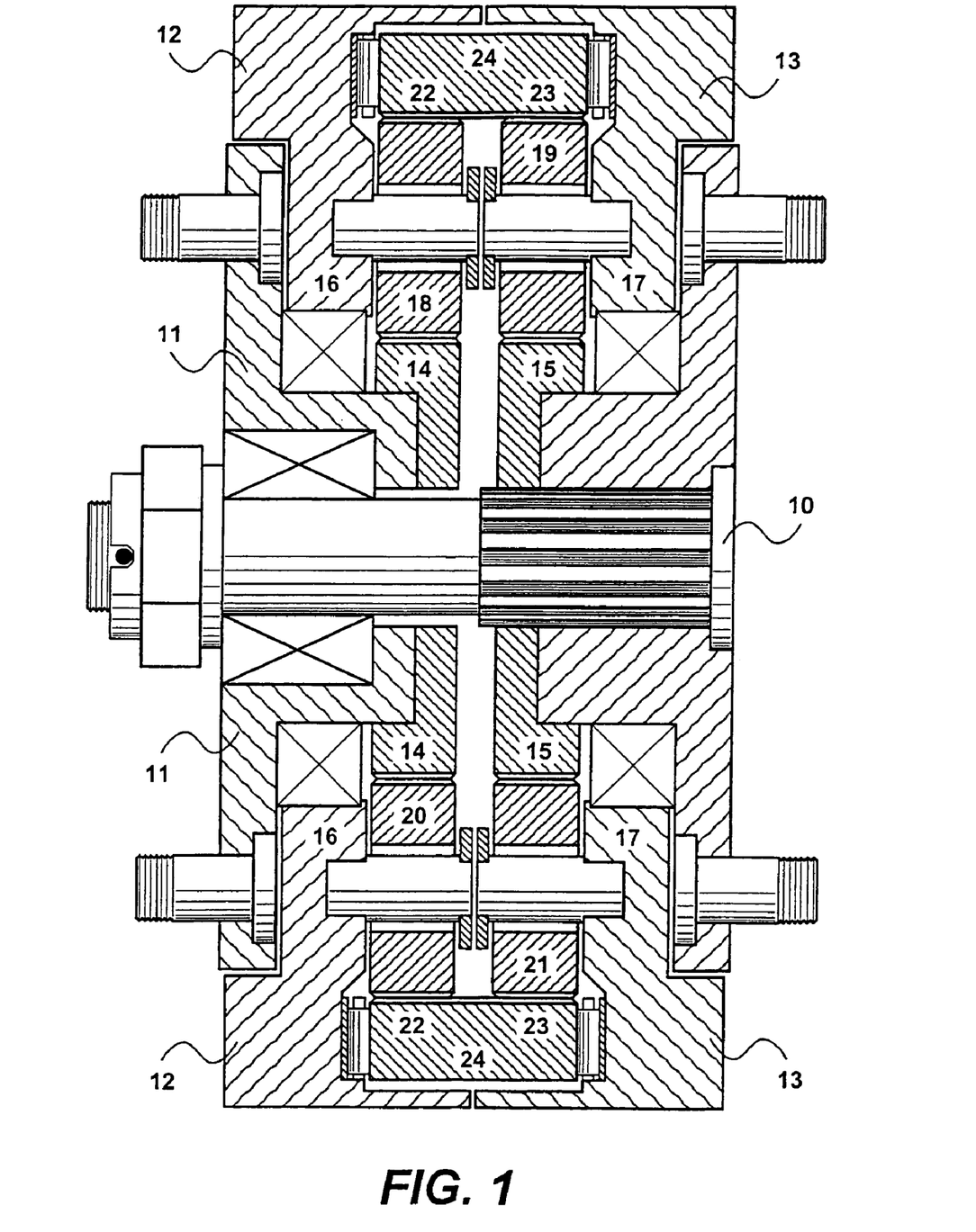
FIG. 1 is a cross section view of a planetary gear set of the present invention.

Reference is now made to the figures wherein like parts are referred to by like numerals throughout. FIG. 1 shows the preferred dual planetary gear set transmission 1A of the present invention including a shaft 10, a differential input 11, input/output means 12, 13, sun gears 14, 15 planet gear carriers 16, 17, planet gears 18, 19, 20, 21 and ring gears 22, 23 in a coupled arrangement denoted as 24. The shaft 10 is grounded by bolts 2 while the differential input 11 is secured by bolts 3. The ratio, regardless of the embodiment practiced, between the input/output means 12, 13 of the transmission 1A is always 1:1 as long as the differential input 11 is at rest. By providing a differential input 11, a proportional differential angle is created between the first gear set and the second gear set (left and right as shown in FIG. 1). The creation of the differential angle alters the ratio between the input/output means 12, 13.

In the preferred embodiment, the sun gear 14 is connected to the differential input 11 and sun gear 15 is connected to grounded shaft 10. The planet gear carriers 16, 17 act as the input/output means 12, 13. The planet gears 18, 19, 20, 21 rotate on their own shafts and are attached to the carriers 16, 17. FIG. 1 shows a coupled ring gear 24 arrangement including ring gears 22, 23. In this fashion, the coupled ring gear 24 spans both (left and right) planetary gear sets comprised of planet gears 18, 19 and 20, 21. The coupling arrangement is designed to transfer power from one planetary gear set to the other. As described below, alternative means for joining, and transferring power between, the two planetary gear sets is available.

Roller bearings 5 adjacent the coupled ring gears 22, 23 and the planet gear carriers 16, 17 maintain the coupled ring gears 22, 23 in their place. Multiple bearings 6 are positioned between the planet carrier 16 and the differential input 11, planet carrier 17 and a fixed support 8 and the differential input 11 and the grounded shaft 10 to facilitate operation of the transmission 1A. It is known in the art to utilize bearings to facilitate transmission operation.

Figure 2:
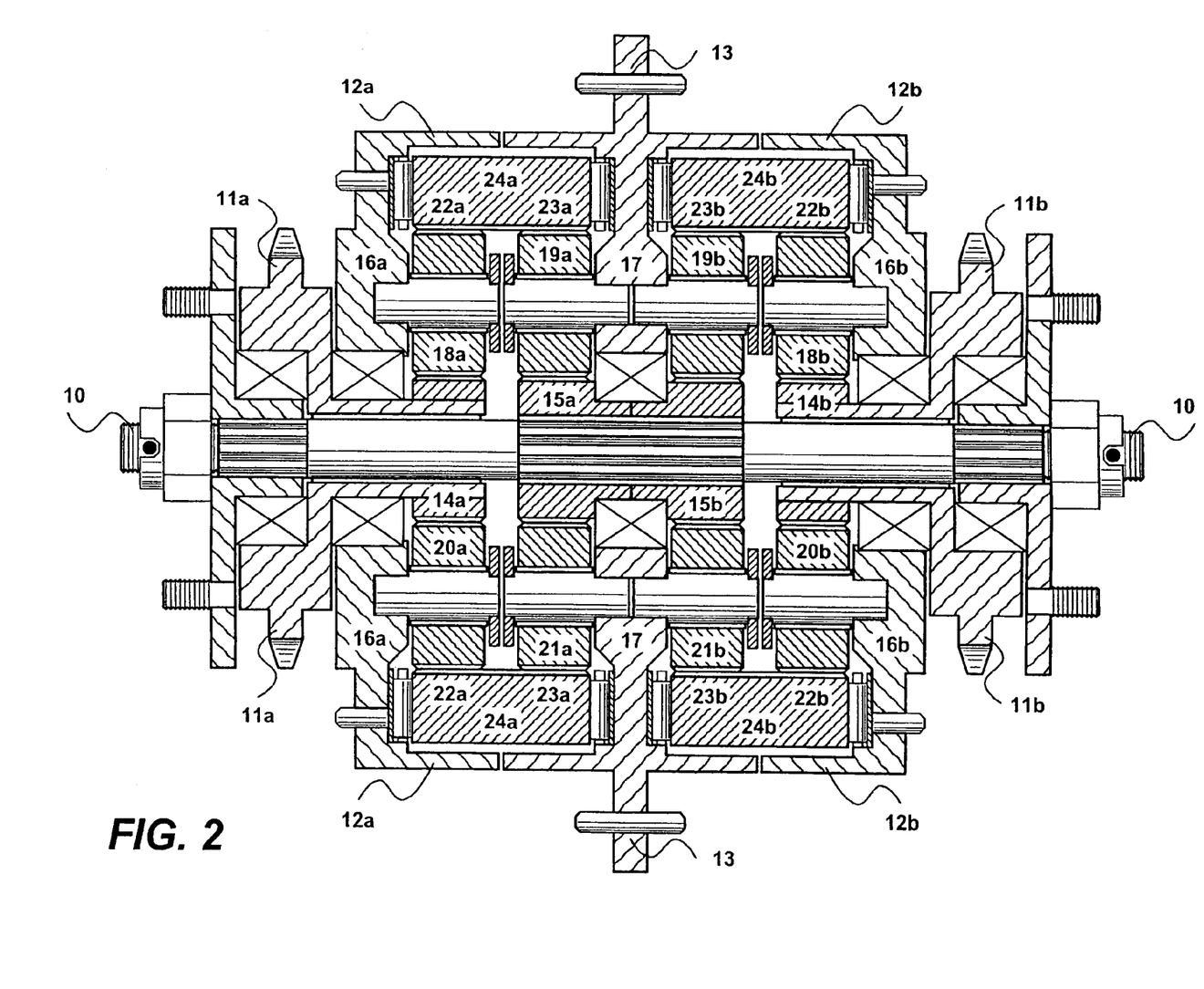
FIG. 2 is a cross section view of a mirrored version of the planetary gear set of the present invention.

Now referring to FIG. 2, a mirrored version of the transmission 1A of FIG. 1 is shown including two dual planetary gear sets or four total planetary gear sets. The transmission 1B includes a shaft 10, differential inputs 11a, 11b, input/output means 12a, 12b, 13, sun gears 14a, 14b, 15a, 15b, planet gear carriers 16a, 16b, 17, planet gears 18a, 18b, 19a, 19b, 20a, 20b, 21a, 21b and ring gears 22a, 22b, 23a, 23b in a coupled arrangements denoted as 24a and 24b. Differential inputs 11a and 11b are shown with sprockets 7 and may be driven by a chain drive (not shown). Alternative drive means are possible without departing from the scope and spirit of the present invention.

The mirrored version of the transmission 1A is joined along a vertical center line by the input/output means 13 and planet gear carrier 17 thereby creating the vertically symmetric transmission 1B.

Figure 3:
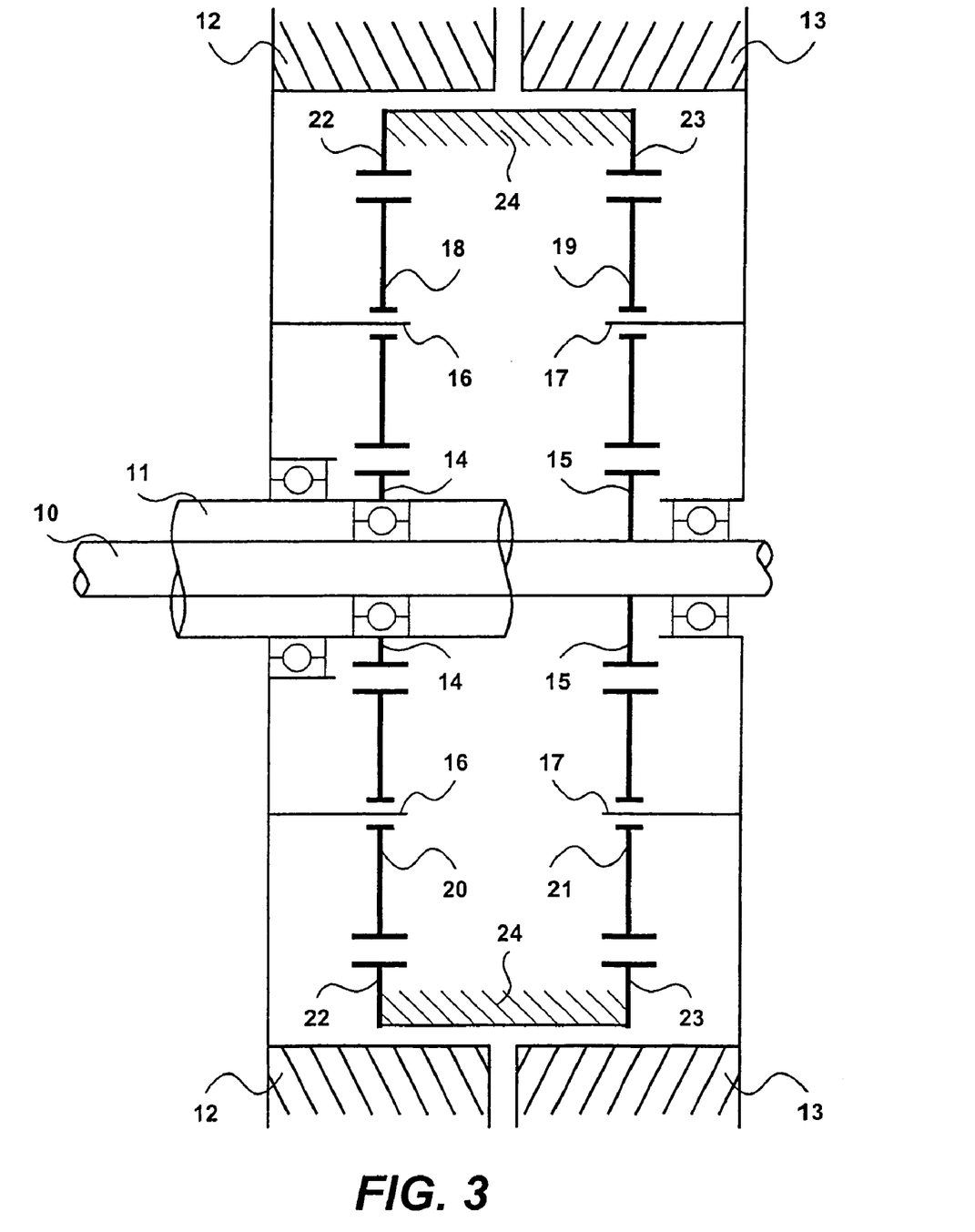
FIG. 3 is a schematic diagram representing the planetary gear set of FIG. 1.

FIG. 3 illustrates a schematic diagram representing the transmission 1A of FIG. 1. As with FIG. 1, the transmission 1A includes a shaft 10, a differential input 11, input/output means 12, 13, sun gears 14, 15 planet gear carriers 16, 17, planet gears 18, 19, 20, 21 and ring gears 22, 23 in a coupled arrangement denoted as 24. The arrangement of the components and their interaction is identical to that shown in FIG. 1.

Figure 4:
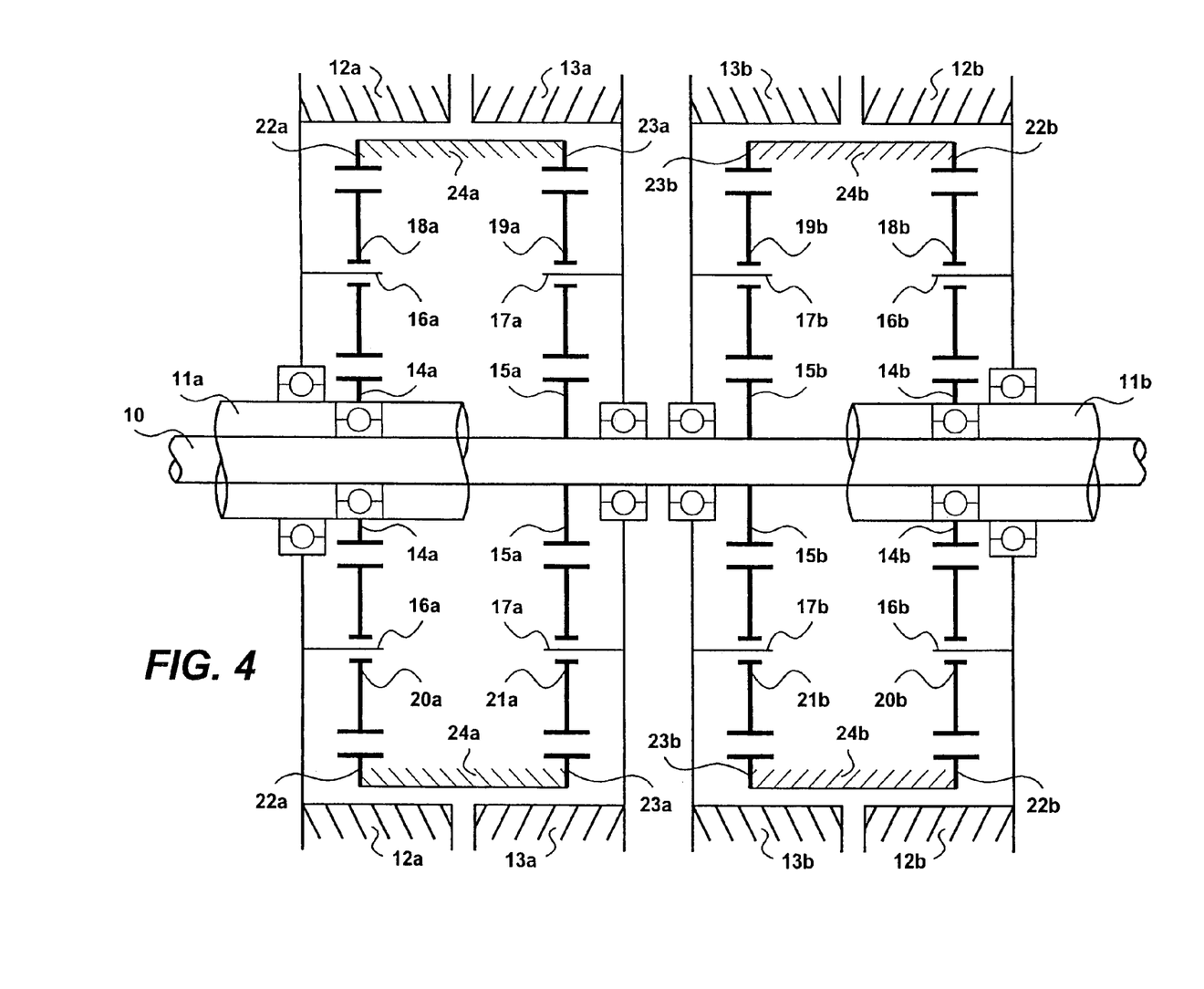
FIG. 4 is a schematic diagram representing the mirrored version of the planetary gear set of FIG. 2.

FIG. 4 illustrates a schematic of the mirrored version of the transmission 1B of FIG. 2. The schematic of transmission 1B includes a shaft 10, differential inputs 11a, 11b, input/output means 12a, 12b, 13a, 13b sun gears 14a, 14b, 15a, 15b, planet gear carriers 16a, 16b, 17a, 17b, planet gears 18a, 18b, 19a, 19b, 20a, 20b, 21a, 21b and ring gears 22a, 22b, 23a, 23b in a coupled arrangements denoted as 24a and 24b. Contrary to FIG. 2, input/output means 13 is implemented as two distinct input/output means 13a and 13b. Similarly, planet gear carrier 17 of FIG. 2, is implemented as two distinct carriers 17a and 17b.

Figure 5:
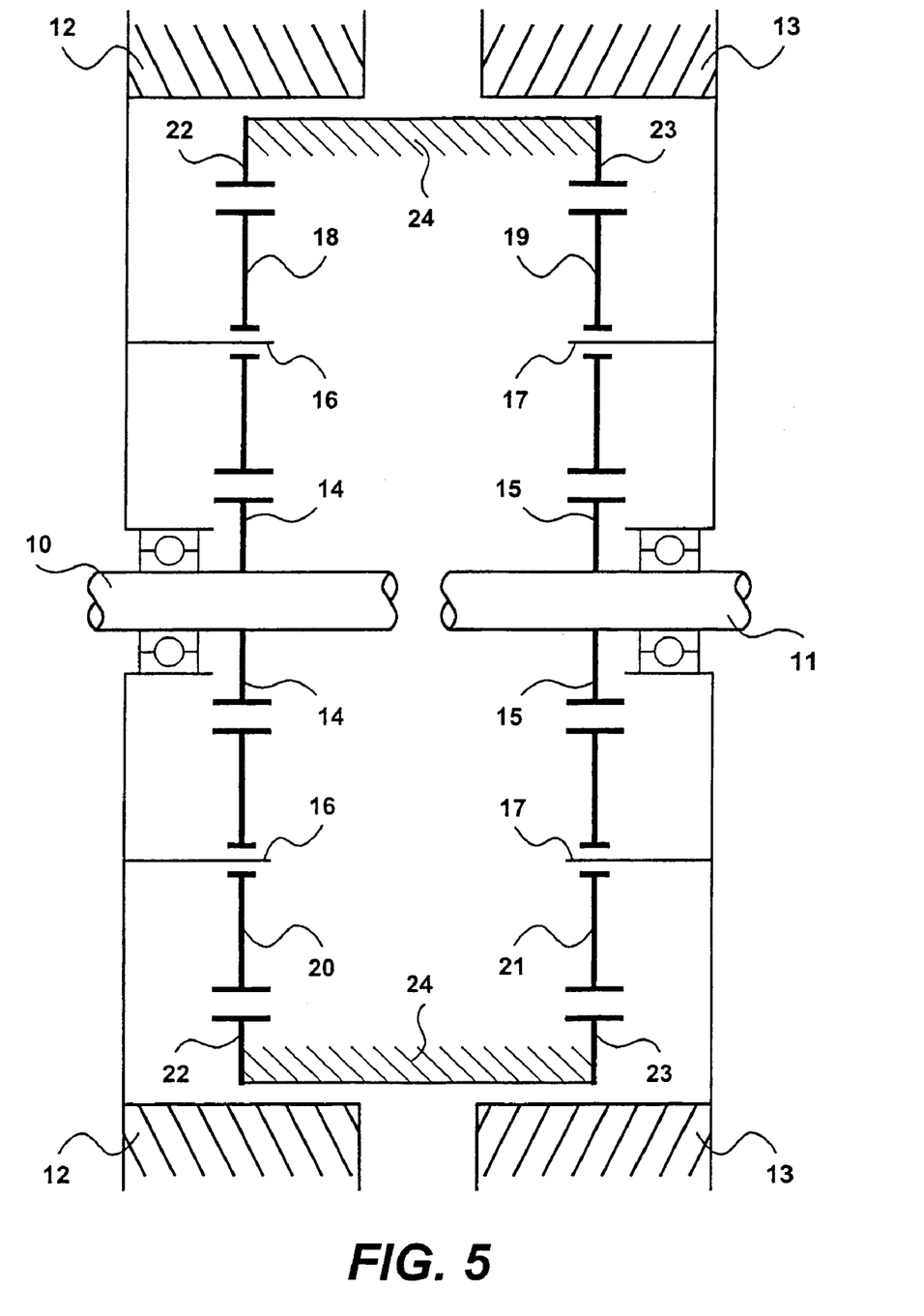
FIG. 5 is a schematic view of a simplified view showing a shaft and differential input split apart to more clearly highlight the different possible configurations for which to practice the present invention.
Figure 6:
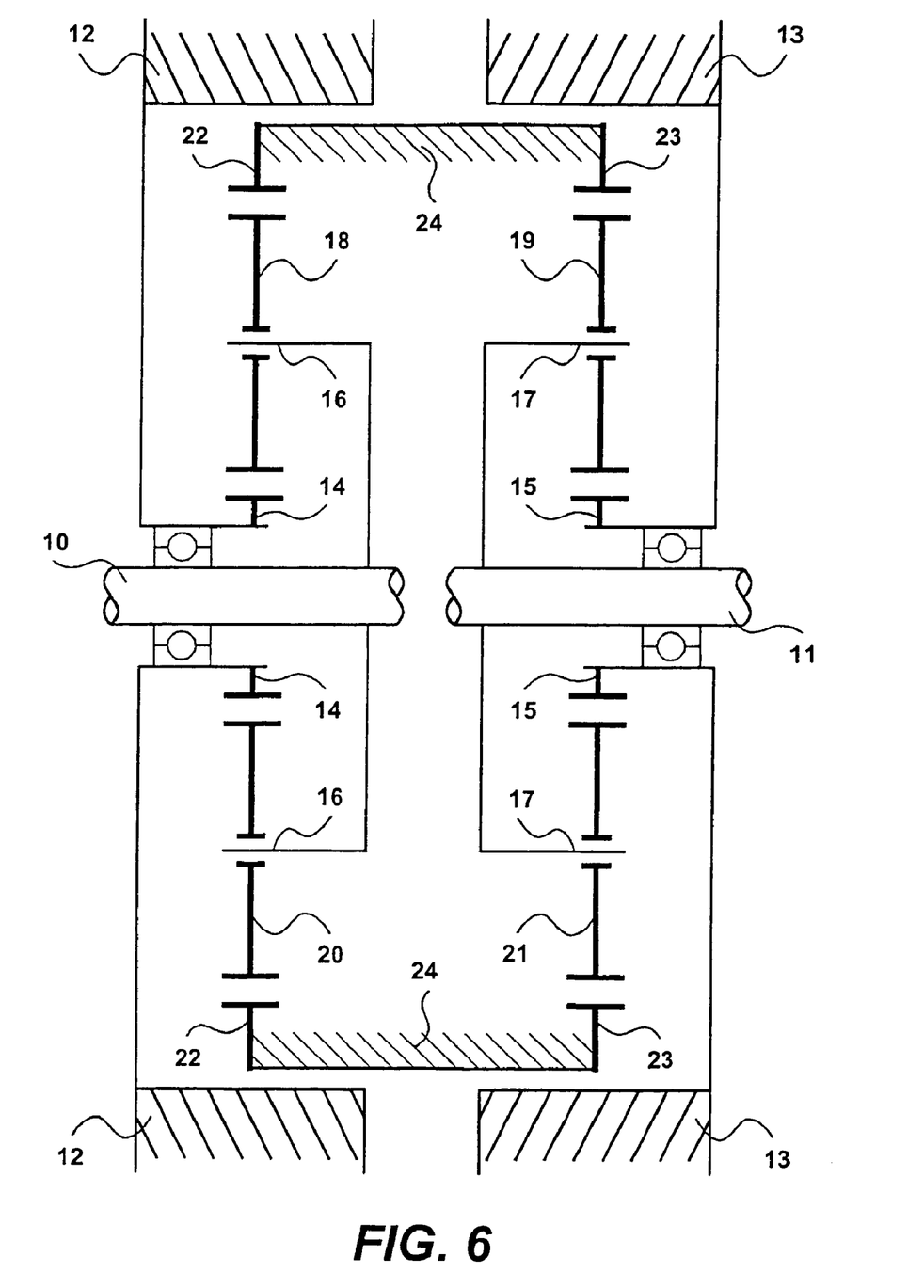
FIG. 6 is a schematic showing sun gears attached to input/output means and carriers attached to shafts contrary to configuration of FIG. 5.
Figure 7:
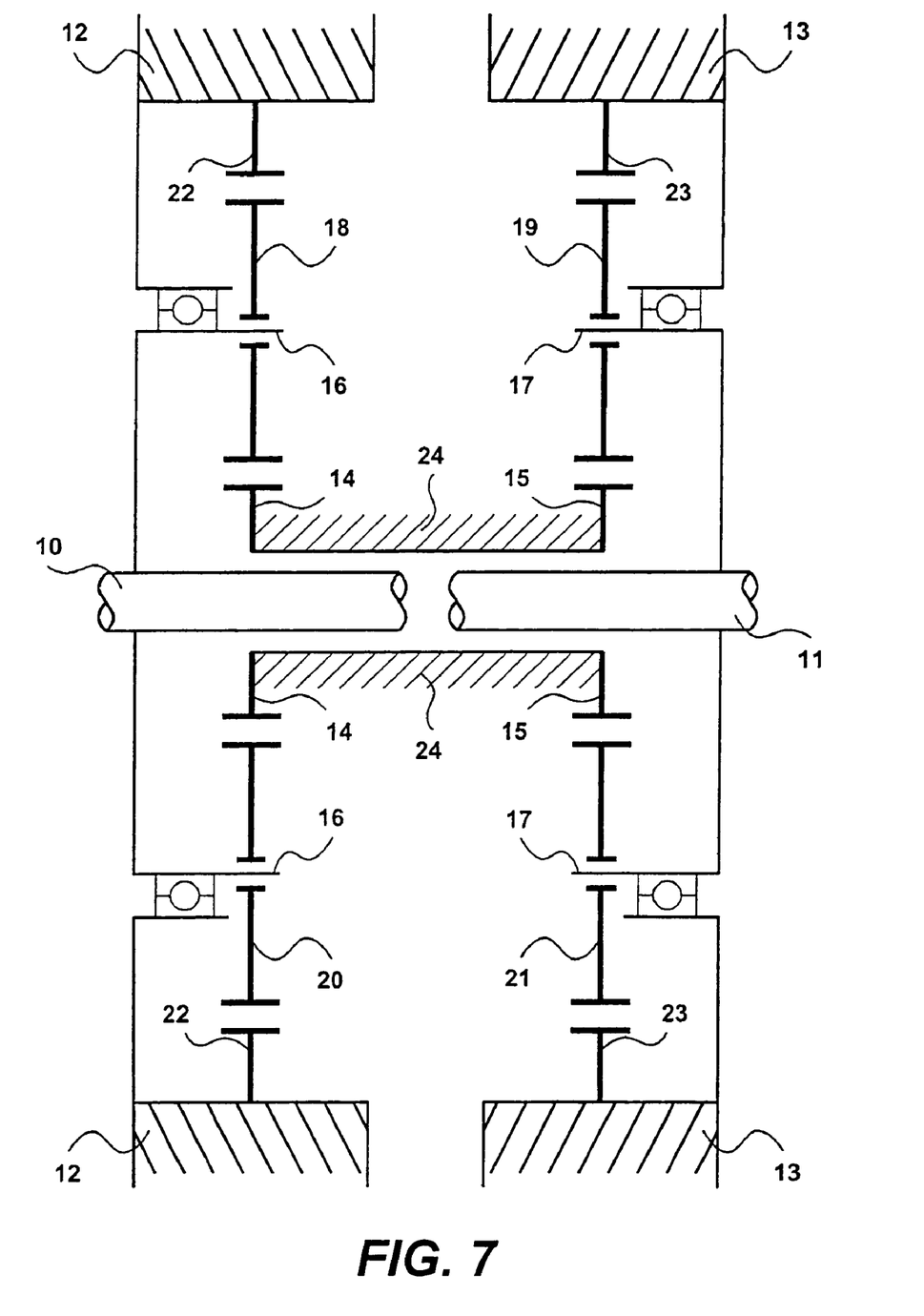
FIG. 7 is a schematic showing the sun gears coupled together rather than the ring gears which are now attached to input/output means.
Figure 8:
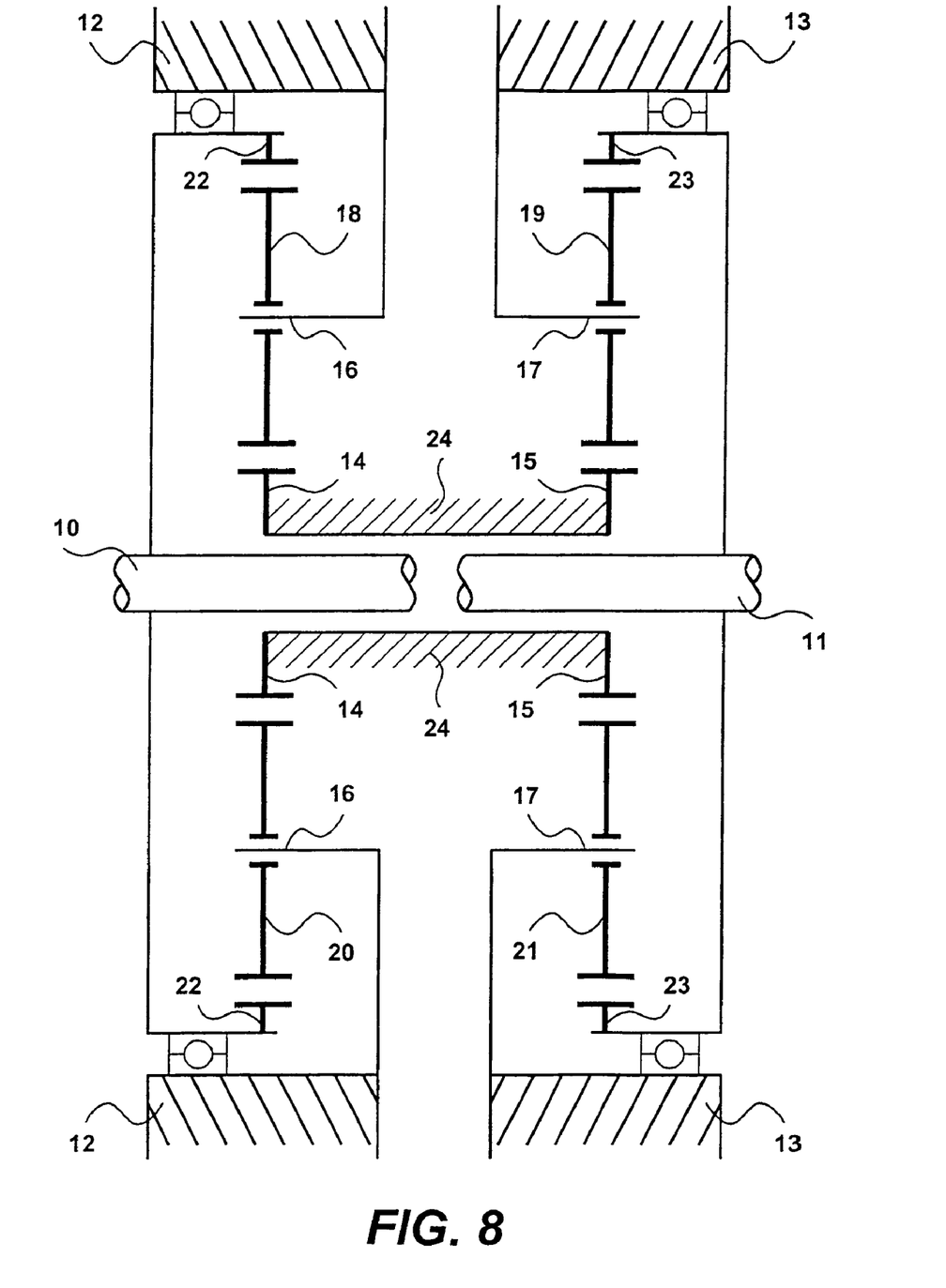
FIG. 8 is a schematic showing another possible configuration with carriers attached to input/output means and the ring gears attached to shafts.

FIG. 5 illustrates a simplified schematic version of FIG. 3 and is used as the basis for FIGS. 6 through 8. FIG. 5 shows the shaft 10 and differential input 11 split for simplicity. FIGS. 6 through 8 show different embodiments of the present invention. More particularly, FIGS. 6 through 8 show different possible combinations for joining the various gear sets of the present invention while maintaining the necessary underlying characteristics of the transmission. As discussed herein, the necessary underlying characteristics are as follows:

a. Each gear in each gear set is identical to the other gears in that gear set. In other words, each sun gear is identical to the other sun gears, each planet gear is identical to the other planet gears and each ring gear is identical to the other ring gears in the transmission, including the mirrored version;

b. Gear sets are always coupled parallel to each other on either the ring gear side or the sun gear side;

c. The grounded point (e.g. shaft) and differential input are always parallel to each other; and d. The 1:1 ratio input/output members are always parallel to each other.

FIG. 6 shows a schematic of an alternative arrangement of a planetary gear set transmission 1C including a shaft 10, a differential input 11, input/output members 12, 13, sun gears 14, 15 planet gear carriers 16, 17, planet gears 18, 19, 20, 21 and ring gears 22, 23 in a coupled arrangement denoted as 24. In the embodiment shown in FIG. 6, the sun gears 14, 15 are connected to input/output means 12, 13 and the planet carriers 16, 17 are attached to shaft 10 and differential input 11 respectively. The arrangement depicted fulfills the necessary underlying characteristics of the present invention.

FIG. 7 shows a schematic of another alternative arrangement of a planetary gear set transmission 1D includes a shaft 10, a differential input 11, input/output means 12, 13, sun gears 14, 15 planet gear carriers 16, 17, planet gears 18, 19, 20, 21 and ring gears 22, 23. This alternative shows the sun gears 14, 15 coupled, as denoted by 24. With the sun gears 14, 15 coupled, the ring gears 22, 23 are now fixed to input/output means 12, 13. The planet carriers 16, 17 are connected to the shaft 10 and differential input 11 respectively. As with the embodiment depicted in FIG. 6, the arrangement fulfills the necessary underlying characteristics of the present invention.

Now referring to FIG. 8, a schematic of another alternative arrangement of a planetary gear set transmission 1E includes a shaft 10, a differential input 11, input/output means 12, 13, sun gears 14, 15 planet gear carriers 16, 17, planet gears 18, 19, 20, 21 and ring gears 22, 23. Sun gears 14, 15 are again coupled as denoted by 24. The ring gears 22, 23 are now connected to shaft 10 and differential input 11 respectively. The planet carriers 16, 17 are now connected to input/output means 12, 13. As with the embodiments depicted in FIGS. 5 through 7, the arrangement fulfills the necessary underlying characteristics of the present invention.

It should be noted that each of the planetary gear set transmission arrangements shown in FIGS. 6 through 8 can be implemented in a mirrored version similar to that shown in FIGS. 2 and 4. It should be further noted that the present invention provides that all sun gears are equal in size, all planet gears are equal in size and all ring gears are equal in size providing an input/output ratio by changing the differential input as opposed to relying on scaled-up or scaled-down gear sizes.

Any of the mirrored versions of the present invention is well suited, as detailed above, for use within a weight generating device. The left hand side and right hand side of the planetary gear system will each independently control weight generation for each user=s arm or leg. Therefore, unlike with traditional weights or weight systems, a user cannot cheat by lifting a majority of the weight with a strong arm or leg.

Although the invention has been described in detail with reference to a preferred embodiment, additional variations and modifications exist within the scope and spirit of the invention as described and defined in the following claims.

I claim:

1. A dual planetary gear set transmission comprising:
   a first planetary gear set and second planetary gear set arranged in parallel, said first planetary gear set having a first sun gear and said second planetary gear set having a second sun gear, a first plurality of planet gears meshed with said first sun gear and a second plurality of planet gears meshed with said second sun gear, a first planet carrier and a second planet carrier, and a first ring gear meshed with said first plurality of planet gears, and a second ring gear meshed with said second plurality of planet gears;
   a non-rotating fixed axle for supporting said first planetary gear set and said second planetary gear set; and
   wherein said first sun gear and said second sun gear are identical, said first ring gear and said second ring gear are identical, and wherein said first planetary gear set transfers a gear movement to said second planetary gear set via said first ring gear meshed with said first plurality of planet gears and said second ring gear meshed with said second plurality of planet gears such that when providing a differential input a proportional differential angle is created between the first planetary gear set and the second planetary gear set.

2. The dual planetary gear set transmission of claim 1 wherein both said first ring gear and said second ring gear form a set and said first planet carrier and said second planet carrier form a set.

3. The dual planetary gear set transmission of claim 2 further comprising:
   a frame member for providing a fixed mounting point for attaching the transmission to the frame and further providing an axis of rotation for said first planetary gear set and said second planetary gear set;
   an angle member for providing an attachment point for an input of varying degrees;
   a drive member for providing an input for attaching a rotatable energy source;
   a ratio member for providing an attachment point for receiving a combined product of rotatable and manual energy; and
   wherein said angle member and said frame member are connected to said first planet carrier and said second planet carrier, respectively, and said drive member and said ratio member are connected to said first ring gear and said second ring gear, respectively.

4. The dual planetary gear set transmission of claim 3 wherein said angle member and said frame member are connected to said first ring gear and said second ring gear, respectively, instead of said planet carriers.

5. The dual planetary gear set transmission of claim 3 wherein said drive member and said ratio member are connected to said first planet carrier and said second planet carrier, respectively, instead of said ring gears.

6. The dual planetary gear set transmission of claim 3 wherein when said angle member is prevented from turning and said drive member is rotated, said ratio member being in tandem with said drive member.

7. The dual planetary gear set transmission of claim 3 wherein when said drive member is prevented from rotating and said angle member is angularly displaced by a number of degrees, said drive member and said ratio member move in opposite directions by an amount proportional to said angle member's angular displacement.

8. The dual planetary gear set transmission of claim 3 wherein when said drive member is rotated by a rotatable source and said angle member is displaced by a number of degrees, said ratio member rotates in tandem with said drive member, and said ratio member and said drive member are angularly shifted in degrees proportional to said angle member displacement.

* * * * *